United States Patent [19]

McGeorge

[11] Patent Number: 4,695,711
[45] Date of Patent: * Sep. 22, 1987

[54] ELECTRICALLY OPERATED APPLIANCE CONTROLS AND METHODS OF MAKING THE SAME

[75] Inventor: Gram J. McGeorge, Spring Lake, Mich.

[73] Assignee: Robershaw Controls Company, Richmond, Va.

[*] Notice: The portion of the term of this patent subsequent to Jan. 13, 2004 has been disclaimed.

[21] Appl. No.: 912,968

[22] Filed: Sep. 29, 1986

Related U.S. Application Data

[62] Division of Ser. No. 685,775, Dec. 24, 1984, Pat. No. 4,636,621.

[51] Int. Cl.$^4$ .............................................. H05B 1/02
[52] U.S. Cl. .................................. 219/506; 219/492; 340/584; 340/706
[58] Field of Search ............... 219/492, 497, 506, 497, 219/10.55 B, 507–509; 340/706, 584, 588, 589, 582

[56] References Cited

U.S. PATENT DOCUMENTS

| | | | |
|---|---|---|---|
| 4,166,944 | 9/1979 | Scott | 219/508 |
| 4,206,344 | 6/1980 | Fischer et al. | 219/507 |
| 4,467,184 | 8/1984 | Loessel | 219/506 |
| 4,568,927 | 2/1986 | Fowler | 340/706 |

*Primary Examiner*—M. H. Paschall
*Attorney, Agent, or Firm*—Candor, Candor & Tassone

[57] ABSTRACT

Electrically operated appliance controls and methods of making the same are provided, one control comprising an electrically operated device for providing two different functions of the device, an electrically operated visual display unit, and a manually operated selector unit electrically interconnected to the device and the display unit for selecting a desired function of the device and for setting the device to provide that selected function in a desired set manner thereof as being indicated on the display unit by such operation of the selector unit. The selector unit has a manually operated start actuator which when actuated will cause the device to being to produce the selected function thereof and in that selected set manner thereof. The selector unit comprises a manually operated movable selector member which when moved in one direction a certain amount from an off position thereof selects one of the functions and then sets the device to provide that selected function in a desired manner as being indicated on the display unit as the selector member is being moved in the one direction and which when moved in the other direction a certain amount from the off position thereof selects the other of the functions and then sets the device to provide that selected function in a desired manner as being indicated on the display unit as the selector member is being moved in the other direction.

20 Claims, 11 Drawing Figures

ELECTRICALLY OPERATED APPLIANCE CONTROLS AND METHODS OF MAKING THE SAME

CROSS REFERENCE TO RELATED APPLICATION

This application is a divisional patent application of its copending parent patent application, Ser. No. 685,775 filed Dec. 24, 1984 now U.S. Pat. No. 4,636,621.

BACKGROUND OF THE INVENTION

1. Field of the Invention

This invention relates to new electrically operated appliance controls and to new methods of making the same.

2. Prior Art Statement

It is known to provide an electrically operated appliance control comprising an electrically operated device for providing two different functions of the device, an electrically operated visual display unit, and a manually operated selector means electrically interconnected to the device and the unit for selecting a desired function of the device and for setting the device to provide that selected function in a desired set manner thereof as being indicated on the display unit by such operation of the selector means, the selector means having a manually operated start actuator which when actuated will cause the device to begin to produce the selected function thereof and in that selected set manner thereof. For example, see the copending U.S. patent application of Daniel L. Fowler, Ser. No. 433,684, filed Oct. 12, 1982, now U.S. Pat. No. 4,568,927 and published on Apr. 23, 1984 as European Patent Application Publication No. 0,109,182.

It is also known to provide an electrically operated appliance control comprising an electrically operated device for providing various modes of operation thereof, an electrically operated visual display unit, and a manually operated selector means electrically interconnected to the device and the unit for selecting a desired mode of operation of the device and for setting the device to provide that selected mode in a desired set manner thereof as being indicated on the display unit by such operation of the selector means, the selector means having a manually operated start actuator which when actuated will cause the device to begin to produce the selected mode of operation thereof and in that selected set manner thereof. For example, see the aforementioned copending patent application.

SUMMARY OF THE INVENTION

It is one feature of this invention to provide a new electrically operated appliance control wherein the selector means thereof provides for a minimum number of operations by the operator to cause the control to operate its appliance in a desired manner.

In particular, it was found according to the teachings of this invention that present electronic or electrically operated controls, such as a control for operating the cooking operation of a cooking apparatus, used cumbersome two-handed data entry, slow slew data entry, or multiple digital key entry whereby errors in data entry in such touch controls are common and usually result in an error message in the display unit of the control. When such an error is made, it usually results in a complete resetting and reprogramming of the desired input data. In addition, such touch controls do not limit the data entry range and this can also cause an error mode. Slew entry controls are cumbersome, slow to respond and are not flexible to an operator's mood or age. For example, such slew control data entry sometimes results in passing the desired data point and having to proceed through the entire data entry range to achieve the desired input.

Accordingly, it was found according to the teachings of this invention that the selector means can comprise a manually operated movable selector member which when moved can provide a simplicity of human interface with the control utilizing the same.

For example, one embodiment of this invention provides an electrically operated appliance control comprising an electrically operated device for providing two different functions of the device, an electrically operated visual display unit, and a manually operated selector means electrically interconnected to the device and the unit for selecting a desired function of the device and for setting the device to provide that selected function in a desired set manner thereof as being indicated on the display unit by such operation of the selector means, the selector means having a manually operated start actuator which when actuated will cause the device to begin the selected function thereof and in that selected set manner thereof. The selector means comprises a manually operated movable selector member which when moved in one direction a certain amount from an off position thereof to a first position thereof selects one of the functions and then sets the device to provide that selected function in a desired manner as being indicated on the display unit as the selector member is being further moved in the one direction from the first position thereof and which when moved in the other direction a certain amount from the off position thereof to a second position thereof selects the other of the functions and then sets the device to provide that selected function in the desired manner as being indicated on the display unit as the selector member is being further moved in the other direction from the second position thereof.

In one electrically operated appliance control of this invention as set forth above, the one function of the device thereof is a time of day function and the other function of the device thereof is a rundown interval timer function.

Another embodiment of this invention provides an electrically operated appliance control comprising an electrically operated device for providing various modes of operation thereof, an electrically operated visual display unit, and a manually operated selector means electrically interconnected to the device and the unit for selecting a desired mode of operation of the device and for setting the device to provide that selected mode in a desired set manner thereof as being indicated on the display unit by such operation of the selector means, the selector means having a manually operated start actuator which when actuated will cause the device to begin to produce the selected mode of operation thereof and in that selected set manner thereof. The selector means comprises a manually movable selector member which when moved in one direction a certain amount from an off position thereof to a first position thereof first selects one of the modes of operation and then sets the device to provide that selected mode of operation in a desired manner thereof as being indicated on the display unit as the selector member is being further moved in the one direction from the first position thereof to a certain second position thereof and which when moved in the one direction to the second position thereof selects another mode of operation thereof and then sets the device to provide that other selected mode of operation in a desired manner as being indicated on the display unit as the selector member is being further moved in the one direction beyond the second position thereof.

In one electrically operated appliance control of this invention as set forth above, the device thereof has means that is adapted to operate the heating means of an oven of a cooking apparatus. The one mode of operation of the device is to have the means thereof operate the heating means in the baking mode thereof and the other mode of operation of the device is to have the means thereof operate the heating means in a broiling mode thereof.

Accordingly, it is an object of this invention to provide a new electrically operated appliance control having one or more of the novel features of this invention as set forth above or hereinafter shown or described.

Another object of this invention is to provide a new method of making an electrically operated appliance control, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
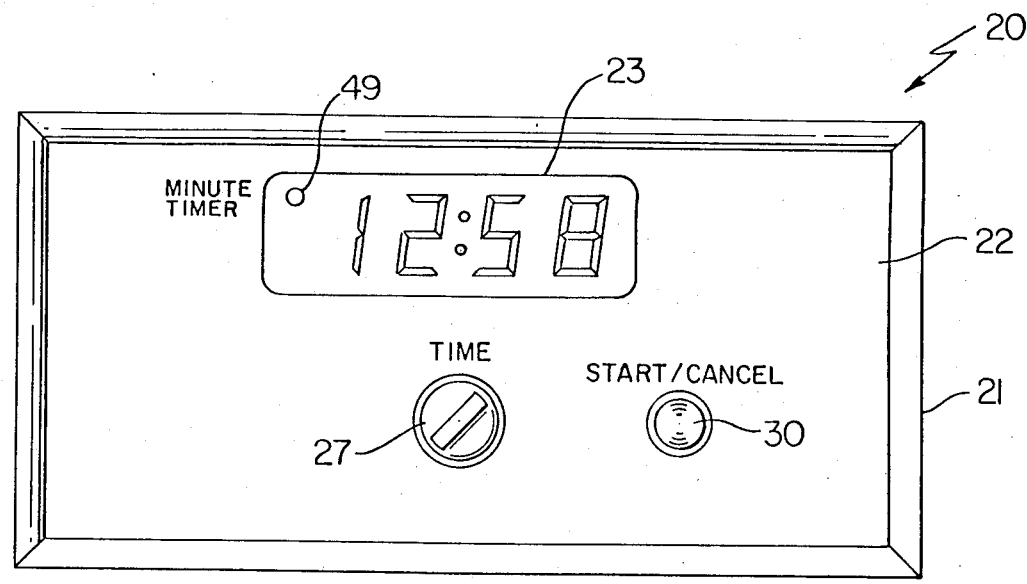
FIG. 1 is a front view of one embodiment of the electrically operated appliance control of this invention.

While the various features of this invention are hereinafter illustrated and described as being particularly adapted to provide an electrically operated appliance control for a cooking apparatus, it is to be understood that the various features of this invention can be utilized singly or in various combinations thereof to provide an electrically operated appliance control for other appliances as desired.

Therefore, this invention is not to be limited to only the embodiments illustrated in the drawings, because the drawings are merely utilized to illustrate one of the wide variety of uses of this invention.

Figure 2:
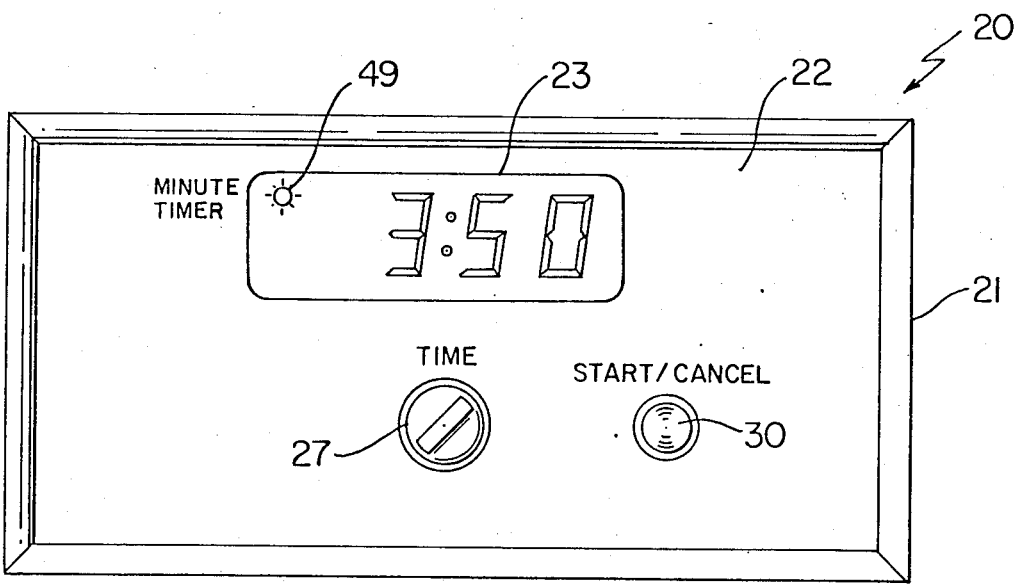
FIG. 2 is a view similar to FIG. 1 and illustrates the control of FIG. 1 in a different operating condition thereof.
Figure 9:
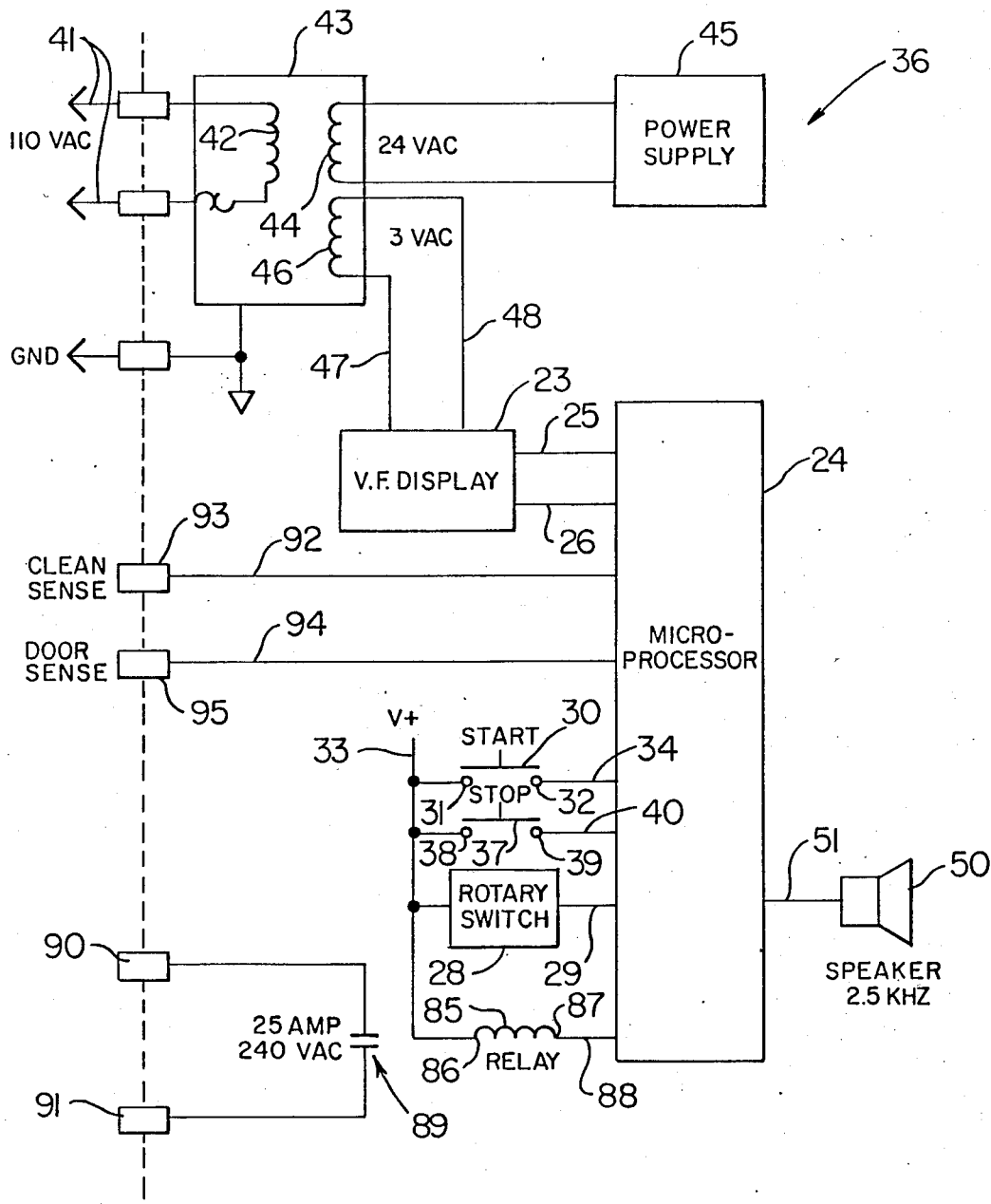
FIG. 9 is a schematic view illustrating the electrical means of the electrically operated appliance control of FIG. 3.

Referring now to FIGS. 1 and 2, an electrically operated appliance control of this invention is generally indicated by the reference numeral 20 and comprises a frame means 21 adapted to be secured to an appliance, such as a cooking apparatus (not shown), in any suitable and conventional manner and has a front panel means 22 provided with a visual display unit 23 which comprises a vacuum fluorescent display unit that is conventional in the art and is electrically interconnected to an electrically operated device which comprises a microcomputer based control or microprocessor that is conventional in the art, such electrically operated device being indicated by the reference numeral 24 in FIG. 9 ad being electrically interconnected to the visual display unit 23 by electrical lead means 25 and 26.

As illustrated in FIGS. 1 and 2, the control 20 includes a movable selector member 27 of a manually operated selector means that comprises a rotary switch, such manually operated selector means being indicated by the reference numeral 28 in FIG. 9 and being electrically interconnected to the electrically operated device 24 by the electrical lead means 29 in a conventional manner whereby the rotary switch 28 is, in effect, also electrically interconnected to the visual display unit 23 through the device 24 and electrical lead means 25 and 26 in a manner hereinafter set forth.

The control 20 of FIGS. 1 and 2 also includes a manually operated actuator 30 which comprises a mechanical switch member that is adapted to interconnect a power source lead means to the electrically operated device 24.

In particular, it can be seen in FIG. 9 that the actuator 30 is adapted to electrically interconnect a pair of contacts 31 and 32 together when the actuator member 30 is pushed inwardly relative to the control panel 22 and thereby interconnect a power source lead means 33 to a lead means 34 that is interconnected to the device 24, the actuator 30 being normally biased to the open condition illustrated in FIG. 9 by suitable spring means (not shown) in a conventional manner whereby the actuator 30 comprises a discrete momentary switch.

As illustrated in FIG. 9 the rotary switch 28 is also adapted to interconnect the power source lead means 33 to the lead means 29 that leads to the device 24 for a purpose hereinafter set forth.

Figure 3:
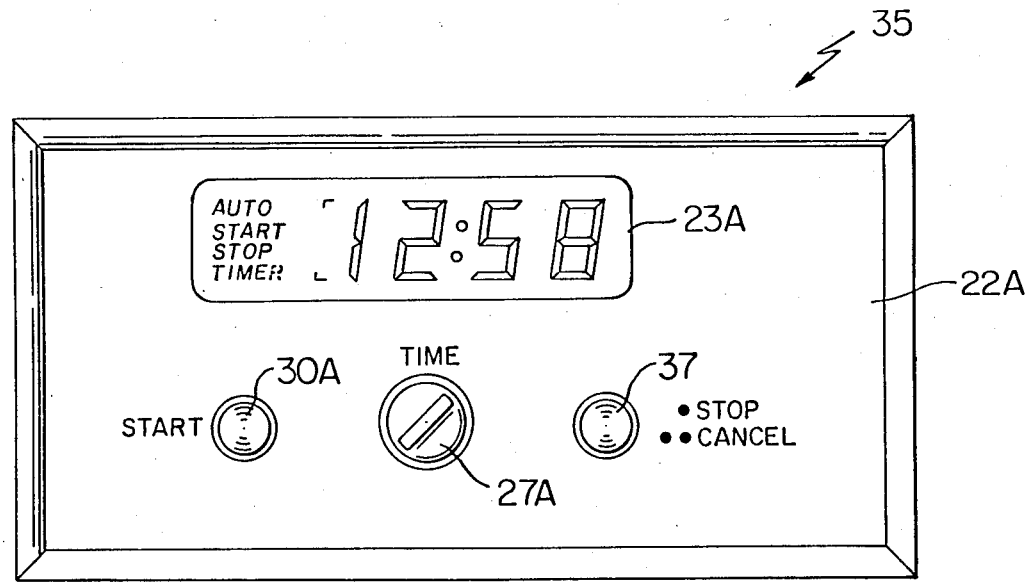
FIG. 3 is a view similar to FIG. 1 and illustrates another embodiment of the electrically operated appliance control of this invention.

FIG. 9 illustrates the electrical means of another electrically operated appliance control of this invention that is generally indicated by the reference numeral 35 in FIG. 3, the electrical means of FIG. 9 being generally indicated by the reference numeral 36. However, it will be apparent that the electrically operated appliance control 35 of FIG. 3 is substantially the same as the electrically operated appliance control 20 of FIGS. 1 and 2 except that the appliance control 35 has an additional actuator 37 that, in a manner similar to the actuator 30, is adapted to interconnect a pair of contacts 38 and 39 together when the actuator 37 is moved inwardly relative to the control panel means 22A of the conrol 35 and thereby is adapted to interconnect the power source lead means 33 to a lead means 40 that is interconnected to the device 24 for a purpose hereinafter described, the actuator 37 being normally biased to an open condition thereof as illustrated in FIG. 9 by suitable spring means (not shown) in a conventional manner whereby the actuator 37 also comprises a discrete momentary switch.

As illustrated in FIG. 9, a suitable alternating electrical power source 41, such as the electrical power source for a home or building, is interconnected to a primary coil 42 of a transformer means 43 which through a secondary coil 44 supplies a 24 volt alternating current at a power supply 45 while providing through another secondary coil 46 a 3 volt alternating current to the visual display unit 23 through electrical lead means 47 and 48 to operate the visual display 23 under the control of the microprocessor or device 24 in a manner hereinafter set forth and in a manner conventional in the art.

The power supply 45 of FIG. 9 provides the voltage source 33 for operating the microprocessor or device 24 in a manner hereinafter set forth.

The electrically operated appliance control 20 of this invention as illustrated in FIGS. 1 and 2 has all of the electrical means of the circuit means 36 of FIG. 9 that has been described above and is adapted to provide two different functions of operation of the electrically operated device 24 of FIG. 9. One of those functions is a time of day function as illustrated at the visual display unit 23 in FIG. 1 and the other function is a selectable rundown interval timer function as indicated on the visual display unit 23 of FIG. 2 with the minute timer annunciator 49 being lit as graphically illustrated in FIG. 2.

In particular, when it is desired to utilize the control 20 to provide a rundown interval timer function, the operator merely grasps the selector member 27 and rotates the same in a clockwise direction in FIGS. 1 and 2 from its present stationary and thus its "off" condition and through the rotary switch means 28 and the preprogramming of the microprocessor 24 causes the display unit 23 to change from the "time of day" of FIG. 1 to minutes/seconds with the minute timer annunciator 49 being lit as illustrated in FIG. 2. Further rotation of the selector member 27 in the clockwise direction will increment in 4, 10, 30 and 60 second increments up to 99 minutes as provided on the display 23, clockwise movement increasing the minutes/seconds on the display 23 and counterclockwise movement of the selector member 27 will decrement on the display 23 in a reverse manner through the rotary switch means 28 as will be apparent hereinafter. Once the desired interval timer period has been selected by the selector member 27 as indicated on the display 23, such as 3 minutes and 50 seconds as illustrated in FIG. 2, the microprocessor 24 will provide such selected rundown timer function for such selected time period when initiated by the operator merely pushing inwardly on the actuator 30 to bridge the contacts 31 and 32 whereby the microprocessor 24 will begin to operate through the 3 minute and 50 second interval time period and will decrement the time on the display unit 23 in 1 second increments which when elapsed will sound an end of cycle alarm for three seconds, such an alarm being indicated by the reference numeral 50 in FIG. 9 and being interconnected to the microprocessor 24 by lead means 51. The microprocessor 24 will continue to sound the alarm for ½ second every 10 seconds until the actuator 30 is touched to close the contacts 31 and 32 or until the control 20 automatically resets after the lapse of a predetermined time period, such as 10 minutes after the rundown of the selected interval timer period.

However, at any time during the rundown of the selected interval timer period, the interval timer period may be cancelled by merely rotating the selector member 27 counterclockwise until the "time of day" appears in the display unit 23 or by touching the actuator 30 to momentarily close contacts 31 and 32 as the device 24 has been preprogrammed to act in this manner when receiving such signals.

Thus, it can be seen that the actuator 30 is properly labeled a "start/cancel" actuator on the display panel means 22 and the selector member 27 is correctly labeled a "time" member on the display unit 23.

Should it be desired to change the time of day setting of the microprocessor 24 and, thus, the time of day that is appearing on the display unit 23 in FIG. 1 for any purpose, such as to correct the time of day setting, the selector member 27 is rotated counterclockwise from its present stationary and, thus, its present "off" position of FIG. 1 of a certain amount, such as through a counterclockwise rotation of 270° or even 360° depending upon the preprogramming of the device 24 at which time the selector member 27 will cause the device 24 to be set in its time of day changing mode and then will increment in one minute increments the time of day of the microprocessor 24 and thus the time of day being disposed on the display unit 23 as the selector member 27 is further rotated in a counterclockwise direction. However, the time of day can be decremented as the selector member 27 is moved in a clockwise direction after the clock set mode has been entered by the selector member 27 in the manner previously described. Once the desired new setting of the time of day for the microprocessor 24 has been selected by the selector member 27 as provided on the display unit 23, the operator then sets the clock to that time of day by touching the "start/cancel" actuator 30 to close the contacts 31 and 32 whereby the microprocessor 24 then will continue to operate the time of day at the new setting thereof.

Therefore, it can be seen that the electrically operated appliance control 20 of this invention comprises an electrically operated device 24 for providing two different functions of the device 24, and electrically operated visual display unit 23 and a manually operated selector means 27, 30 electrically interconnected to the device 24 and the unit 23 for setting the device 24 to provide that selected function in a desired set manner thereof as being indicated on the display unit 23 by such operation of the selector means 27, 30, the selector means having a manually operated start actuator 30 which when actuated will cause the device 24 to begin to produce the selected function thereof and in that selected set manner thereof. The selector means 27, 30 comprises a manually operated movable selector member 27 which when moved in one direction a certain amount from an off position thereof selects one of the functions (time of day function) and then sets the device 24 to provide that selected function in a desired manner as being indicated on the display unit 23 as the selector member 27 is being moved in that one direction and which when moved in the other direction a certain amount from the off position thereof selects the other of the functions (interval timer function) and then sets the device 24 to provide that selected function in a desired manner as being indicated on the display unit 23 as the selector member 27 is being moved in that other direction.

While the rotary switch means 28 can comprise any suitable rotary switch means that permits the selector member 27 to provide its function in the manner previously described, such rotary switch means 28 can be of the type fully disclosed in the aforementioned copending patent application Ser. No. 433,684 filed Oct. 12, 1982, or of the type fully set forth in another copending U.S. patent application, Ser. No. 678,440, filed Nov. 29, 1984 now U.S. Pat. No. 4,625,084 (Robertshaw Controls Company Docket No. 3248-S) of Daniel L. Fowler et al whereby these two copending patent applications are being incorporated into this disclosure by this reference thereto.

However, the present preferred rotary switch means 28 for the controls of this invention is generally indicated by the reference numeral 52 in FIGS. 6, 7 and 8 and will now be described.

The rotary switch means 52 comprises a cup-shaped housing means 53 having a closed end 54 and an open end 55 that is closed by a circuit board means 56, the cup-shaped housing member 54 and circuit board means 56 being formed of any suitable electrically insulating material with the circuit board means 56 having the surface 57 that closes the open end 55 of the housing means 53 provided with three circular conductive code paths 58, 59 and 60 disposed thereon in a concentric manner relative to each other and to a center point 61. The code paths 58, 59 and 60 are respectively interconnected to external terminal means 62, 63 and 64 by interconnecting code path portions 65, 66 and 67. The code paths 59 and 60 respectively have non-interconnected or non-conductive open sections 68 and 69 through which the conductive path 65 of the inner circular path 58 is disposed while the conductive path 66 of the circular path 59 also passes through the section 69 of the outer circular path 60 whereby the conductive paths 58, 59 and 60 are not electrically connected to each other on the circuit board means 56.

Figure 7:
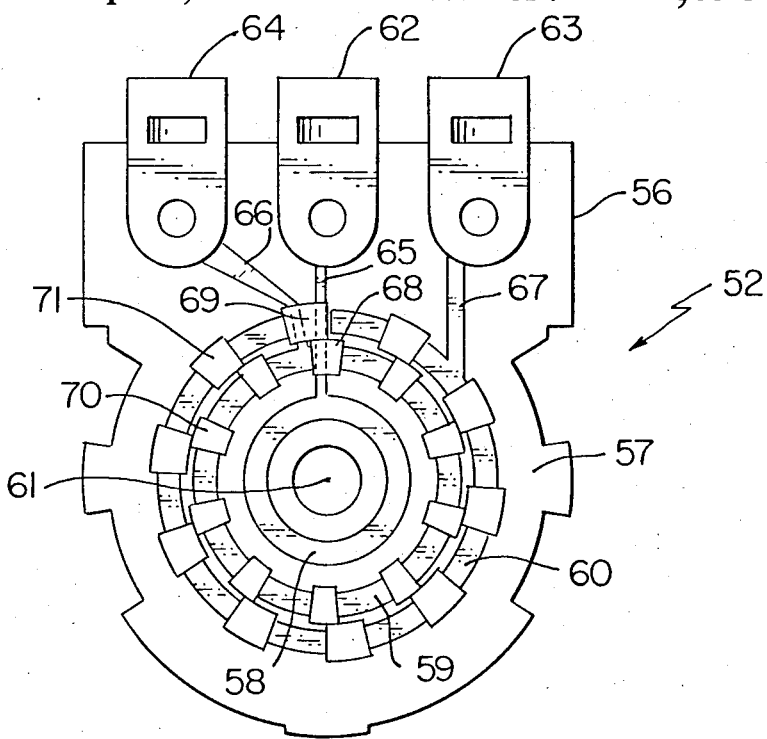
FIG. 7 is a fragmentary cross-sectional view taken on line 7—7 of FIG. 6.
Figure 8:
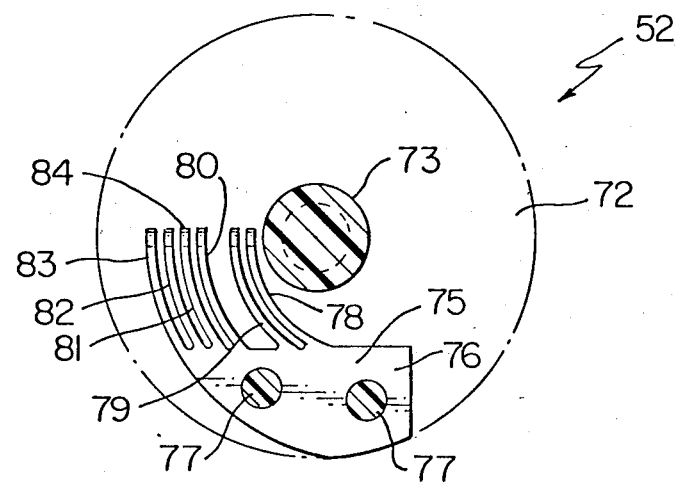
FIG. 8 is a cross-sectional view taken on line 8—8 of FIG. 6 with certain of the background structure removed.

A plurality of non-conductive sections 70 and 71 are disposed respectively on the conductive paths 59 and 60 in equally spaced apart relations thereon and in an offset manner relative to each other as illustrated in FIG. 7 so that each conductive path 59 and 60 has a plurality of conductive sections each being separated from an adjacent conductive section by a non-conductive section 70 or 71 as illustrated and for a purpose hereinafter set forth.

The rotary switch means 52 also comprises a rotary disc 72 of any suitable non-conductive material and being fastened to a non-conductive rotary selector shaft 73 which is adapted to project out of an opening 74 in the closed end 54 of the housing member 53 to have the selector member 27 secured thereon in any suitable manner so that the selector member 27 causes rotation of the selector shaft 73 and, thus, the disc 72 relative to the housing means 53 and relative to the circuit board surface 57 as will be apparent hereinafter, the selector shaft rotating on an axis that is substantially aligned with the center point 61 of the circuit board 56.

A contact member 75 formed of electrically conductive material, such as metal, has a body portion 76 fastened to the disc 72 by rivet-like means 77 so that the conductive contact member 75 rotates in unison with the disc 72 under the control of the selector member 27.

The conductive contact member 75 has a plurality of contact fingers 78, 79, 80, 81, 82 and 83 extending therefrom and respectively being provided with free ends 84 that are adapted to engage against the surface 57 of the circuit board means 56 and be biased against the same through the natural resiliency of the fingers 78-83 as the fingers 78-83 have the outer ends 84 thereof bent outwardly from the disc 72 so as to be spring pressed against the surface 57 of the circuit board 56 when the parts of the rotary switch 52 are assembled together.

The fingers 78-83 of the conductive contact member 75 are so constructed and arranged that the ends 84 of the conductive fingers 78 and 79 are both adapted to be respectively disposed in contact with the conductive path 58 and thereby move on the conductive path 58 as the member 72 is rotated relative thereto. Similarly, the contact ends 84 of the fingers 80 and 81 are arranged to ride on the conductive path 59 and the ends 84 of the fingers 82 and 83 are arranged to ride on the conductive path 60. In this manner at least one finger of each pair of fingers will be in contact with its respective conductive path to maintain continuity therewith and thereby tend to eliminate the adverse effects of contact bounce in much the same manner and for the same reasons as set forth in the aforementioned copending patent application of Daniel L. Fowler et al.

Thus, as the selector member 27 is rotated relative to the control panel means 22 of the control 20 previously described, it can be seen that the fingers 78 and 79 are always in contact with the inner conductive path 58 whereas the fingers 80 and 81 are either in contact with the conductive part of the conductive path 59 or with a non-conductive part 70 thereof depending upon the rotational position of the selector member 27. Similarly, the fingers 82 and 83 have the conductive ends 84 thereof disposed in contact with either the conductive portion of the conductive path 60 or a non-conductive part 71 thereof depending upon the rotational position of the selector member 27.

In this manner, the power source lead 33 of FIG. 9 is adapted to be interconnected to the terminal 62 while the terminals 63 and 64 are adapted to be interconnected to the lead means 29 that are interconnected to the microprocessor 24 whereby the microprocessor 24 will determine which direction the selector member 27 is being rotated relative to the circuit board means 57 through the offset relation of the non-conductive portions 70 and 71 of the conductive paths 59 and 60 and thereby will determine which function is being selected by the selector member 27 either being rotated in a clockwise direction for setting the rundown interval timer means or being rotated in a counterclockwise direction to eventually set the time of day setting of the microprocessor 24 in the manner previously described with the incrementing or decrementing of the data information thereafter taking place through the making and breaking of the electrical continuity between the terminal 62 and the terminals 63 and 64 by the fingers riding on the conductive parts or non-conductive parts 70 and 71 of the paths 59 and 60. Such entering of the electrical signals through the rotary movement of the selector means 27 into the microprocessor 24 sets the microprocessor 24 to the desired setting thereof as fully disclosed in the aforementioned U. S. copending patent applications and need not be further described whereby it can be seen that the rotation of the selector member 27 of the rotary selector means 28 of the control 20 is adapted to cause the microprocessor 24 to operate in the manner previously described after the actuator 30 is actuated.

The control 35 of this invention that is illustrated in FIG. 3 has the parts thereof that are similar to the parts of the control 20 indicated by the same reference numeral followed by the reference letter "A" and is not only adapted to have the selector member 27A thereof select a rundown timer function through rotation thereof in a clockwise direction as previously described and to provide for changing the time of day setting of the microprocessor or device 24 through the counterclockwise rotation thereof as previously set forth for the control 20, but also the control 35 is adapted to provide for a delayed selected cooking period or a delayed cleaning operation of the oven of the cooking apparatus (not shown) utilizing the control 35 of this invention.

For example, reference is now made to FIG. 9 wherein the electrical means 36 for the control 35 includes a relay coil 85 having one side 86 thereof interconnected to the power source lead 33 and the other side 87 thereof interconnected by a lead means 88 to the microprocessor 24 whereby when the microprocessor 24 determines that the heating means (not shown) of the oven of the cooking apparatus is to be turned on, the microprocessor 24 will pass an electrical current through the relay coil 85 to close its relay switch means 89 and thereby permit a 25 amp and 240 volt alternating electrical current to pass between terminal means 90 and 91 and thereby flow from a suitable power source (not shown) through the electrical heating means of the oven of the cooking apparatus as long as the switch means 89 is held in a closed condition by electrical current flowing through the relay coil 85 under the control of the microprocessor 24.

The microprocessor or device 24 is also adapted to receive an electrical signal through a lead means 92 from a terminal 93 when the clean mode of the cooking apparatus has been selected by a separate mechanical oven function selector dial (not shown) in a conventional manner.

The microprocessor 24 or device is also adapted to receive an electrical signal through a lead means 94 from a terminal 95 when the oven door (not shown) is disposed in a closed and locked condition thereof as is conventional for ovens that have a clean mode of operation thereof.

In this manner, the microprocessor 24 or device 24 will not operate the coil 85 for a cleaning operation unless appropriate signals are being received thereby from the terminals 93 and 95.

The visual display unit 23A of the control 35 has the words "AUTO", "START", "STOP" and "TIME" or "TIMER" thereon which will light up when a particular operation is being performed by the microprocessor 24 or device as will be apparent hereinafter.

The selector member 27A is adapted to set the microprocessor 24 to change the time setting thereof through rotation of the selector member 27A in a counterclockwise direction as previously described for the control 20 except that the colon in the displayed time in the display unit will be flashing on and off during the operation. Similarly, the selector member 27A is adapted to select a desired rundown interval timer period of the microprocessor 24 through rotation of the selector member 27A in a clockwise direction except that during such selection the word "TIMER" will be lit at the display 23A.

Also, in order to cancel a preselected timer operation for the control 35, the start actuator 30A is not tapped as provided for the control 20 previously set forth. Instead, the actuator 37 which is labeled "STOP/CANCEL" is touched or tapped twice in succession to cause the microprocessor or device 24 to terminate the interval timer period and return the same to the time of day operation thereof as previously set forth for the control 20. Of course the selector member 27A can be used to cancel the interval timer period in the same manner as the selector member 27 for the control 20.

When it is desired to select a delayed start time for either a cooking or cleaning operation, the mechanical oven function selector dial (not shown) remains in its "off" position.

In either event, the operator presses the start actuator 30A for approximately 3 seconds whereby the device 24 will cause the display unit 23A to display the present time of day with the words "START" and "TIME" being lit. The desired start time is then entered into the microprocessor 24 by rotating the selector member 27A in either a clockwise direction or a counterclockwise direction to provide the desired start time on the display unit 23A. The selected start time program is then initiated by touching the start actuator 30A whereby the word "AUTO" will flash on the display unit 23A with 2 seconds on and 2 seconds off during such delay period and light continuously during the on period of operation of the oven.

After the start time has been entered in the control 35, the operator presses the stop actuator 37 for approximately 3 seconds whereby the microprocessor 24 will cause the display unit 23A to present the time of day with the words "STOP" and "TIME" being lit. The stop time is then entered by rotating the selector member 27A to the desired stop time and the stop time selected is then programmed into the microprocessor 24 by touching the start actuator 30A. At this time the microprocessor 24 will cause the display unit to flash the word "AUTO" on and off until the set start time has been reached at which time the word "AUTO" will be continuously on for that selected time period.

The manual selector for the cooking apparatus is then turned to the desired cooking mode thereof or to the clean position thereof and the oven door is locked. The operator then taps the actuator 30A to initiate the delayed operation.

thus, the microprocessor or device 24 has been preprogrammed in the above manner so that when the desired start time is eventually reached by the timer means thereof, the microprocessor 24 will cause an electrical current to flow through the relay coil 85 and thereby close the switch 89 so that the heating means of the cooking apparatus can operate during the selected time period until the stop time is reached whereby the microprocessor 24 will stop current flow through the relay coil 85 and thereby open the switch 89 to stop the operation of the heating means.

If the selected delayed time period is for a cleaning operation, the microprocessor 24 will not operate the heating means unless it receives the appropriate electrical signals through the lead means 92 and 94 that are respectively interconnected to the cleaning sense terminal 93 and door sense terminal 95.

At the end of the delayed cook or clean cycle, the end of cycle alarm 50 will sound for 3 seconds under the control of the microprocessor 24 and then the alarm 50 will continue to sound for ½ second every 10 seconds until the stop actuator 37 is touched or until the control automatically resets at 10 minutes.

The microprocessor 24 can be programmed so that the clean cycle thereof will not exceed 4 hours maximum.

Of course to provide either an immediate cooking operation or an immediate cleaning operation, the manual selector for the oven is turned to the desired setting and the actuator 30A is tapped to initiate the operation. If the clean operation has been selected the oven door must be locked before the actuator 30A will begin the clean operation and the microprocessor 24 is preprogrammed to terminate the clean operation in 2½ hours.

During a delayed cooking or cleaning operation of the control 35, the operation can be cancelled by merely tapping the actuator 37 twice within a two second period.

Of course, it is to be understood that the control 35 could be utilized for a range that does not provide a cleaning operation whereby the delayed start time operation would merely be for a cooking operation thereof.

Figure 4:
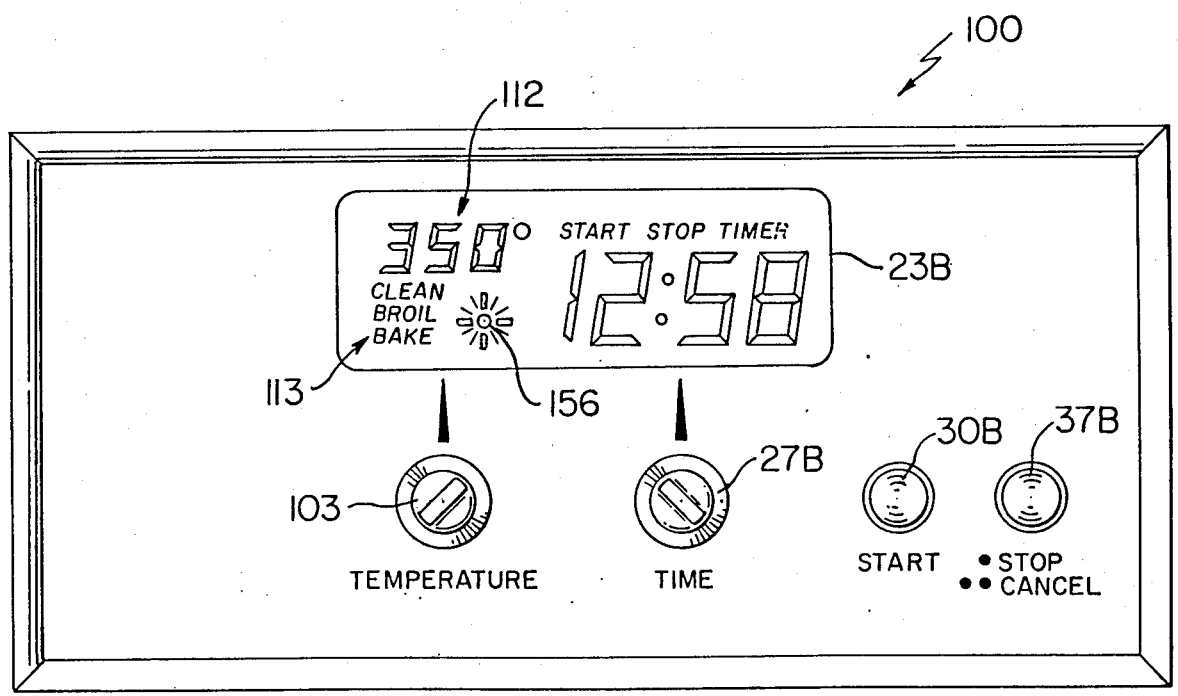
FIG. 4 is a view similar to FIG. 1 and illustrates another embodiment of the electrically operated appliance control of this invention.

Another control of this invention is generally indicated by the reference numeral 100 in FIG. 4 and parts thereof similar to the controls 20 and 35 previously described are indicated by like reference numerals followed by the reference letter "B". Also, another control of this invention is generally indicated by the reference numeral 102 in FIG. 5 and parts thereof similar to the control 100 are indicated by like reference numerals also followed by the reference letter "B".

The complete electrical means of the control 102 is generally indicated by the reference numeral 101 in FIG. 10 and part of this electrical means 101 can be used for the electrical means for the control 100 as will be apparent hereinafter.

Figure 10:
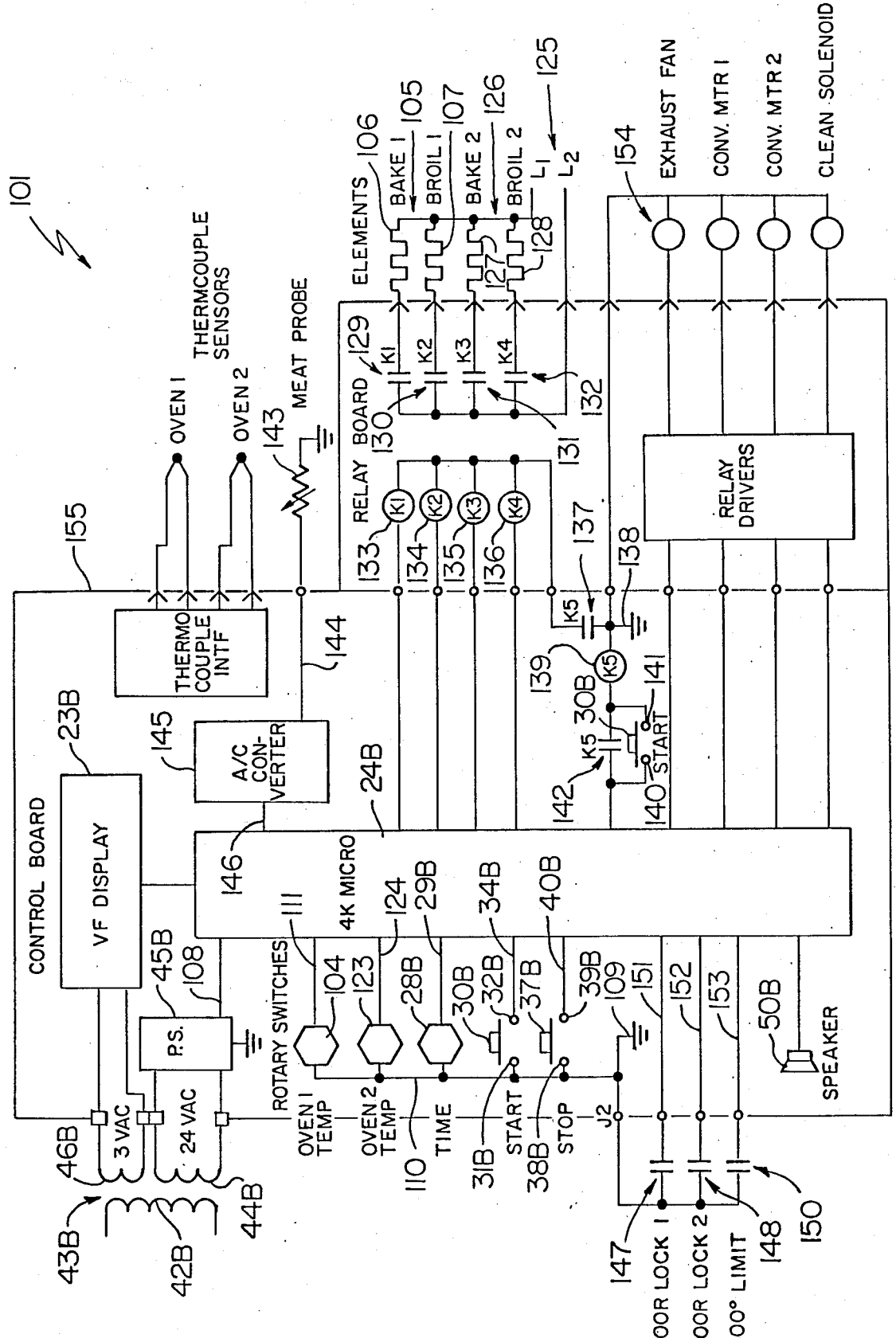
FIG. 10 is a schematic view illustrating the electrical means of the electrically operated appliance control of FIG. 5.

It can be seen in FIG. 4 that the control 100 of this invention is substantially the same as the control 35 previously described except that the same has another selector member 103 that operates a selector means 104 of FIG. 10 in the same manner that the selector means 27B thereof operates the selector means 28B of FIG. 10, the selector means 104 comprising another rotary switch formed in the same manner as the rotary switch 52 that forms the selector means 28B.

However, the selector member 103 causes the microprocessor 24B of FIG. 10 to select a desired mode of operation of the heating means of the cooking apparatus utilizing the control 100 as well as the temperature of that selected mode of operation thereof, such heating means being generally indicated by the reference numeral 105 in FIG. 10 and comprising an electrically operated bake element 106 and an electrically operated broil element 107.

The display unit 23B for the control 100 is operated by the microprocessor 24B under the control of the selector means 27B to provide for a time of day function, a rundown interval timer function, and a delayed start and stop operation through the actuators 30B and 37B for a clean or cooking operation of the heater means 105 in the same manner as is provided for the control 35 previously described except that the electrical means 101 of the control 100 is somewhat different from the electric means 36 in that the power source 45B is directly interconnected to the microprocessor 24B by a lead means 108 and the selector means 104 and 28B have one side thereof interconnected to a ground 109 by a lead means 110 while the other sides thereof are respectively interconnected to the microprocessor 24B by lead means 111 and 29B. In addition, the contact means 31B and 38B of the actuators 30B and 37B are interconnected to the ground lead 110 while the contacts 32B and 39B are interconnected to the microprocessor 24B by the lead means 34B and 40B.

The display means 23B does not have the word "AUTO" thereon and the words "START", "STOP" and "TIME", as well as "TIMER" are disposed above the time of day display thereon and in addition there is an area 112 for displaying a temperature selection and an area 113 for lighting up the words "CLEAN", "BROIL" or "BAKE" in a manner hereinafter set forth.

The microprocessor 24B is so programmed that the selector member 103 when turned in a clockwise direction from the off or present stationary position of FIG. 4 a certain amount will first select a bake mode of operation of the microprocessor 24B and then will set the microprocessor 24B to a desired temperature for that selected baking operation as indicated in the area 112 of FIG. 4 as the selector member 103 is further rotated in a clockwise direction with the temperature incrementing in a manner hereinafter set forth, counterclockwise rotation of the selector member 103 decrementing that temperature setting in a reverse manner as will be apparent hereinafter. When the selector member 103 is rotated in a clockwise direction a certain distance, the selector member 103 then selects another mode of operation of the microprocessor or device 24B which in the embodiment illustrated in FIG. 4 is a broil cooking mode of operation of the microprocessor 24B which is adapted to operate the heating means 105 in a broil mode thereof as will be apparent hereinafter.

Once the selector member 103 has selected the broil mode of operation of the microprocessor 24B, further rotation of the selector member 103 in a clockwise direction selects either a low or high temperature broiling operation thereof and when further rotated in the clockwise direction from the broil mode of operation the same will select a cleaning mode of operation of the microprocessor 24B which will then be adapted to operate the heating means 105 in a cleaning mode of operation thereof.

Figure 11:
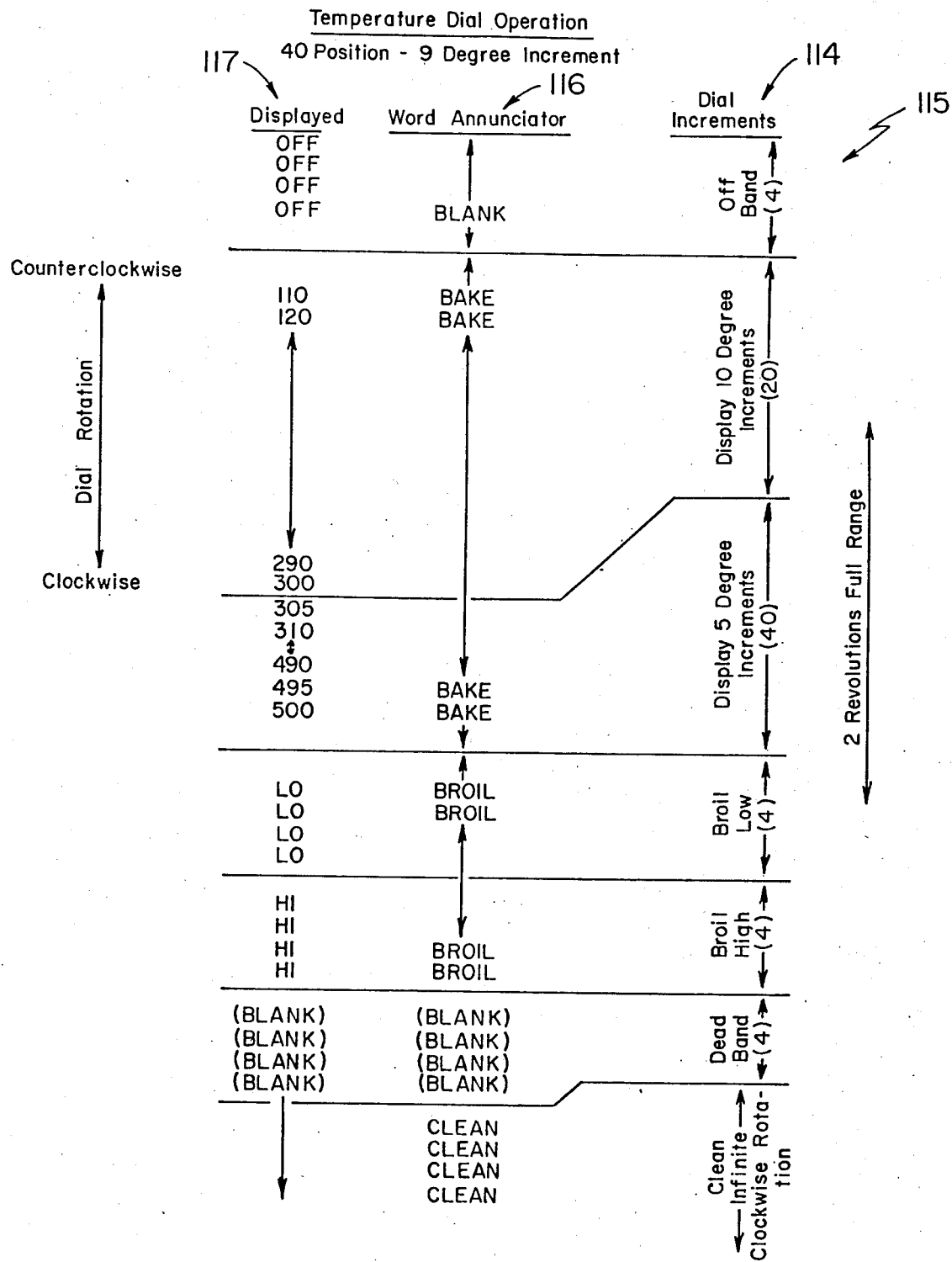
FIG. 11 is a chart illustrating the operation of one of the selector means of the control of the electrically operated appliance control of FIG. 4.

In particular, it can be seen in FIG. 11 that the particular rotary switch means 104 for the control 100 comprises a 40 position rotary switch means for each 360° rotation thereof whereby the same is designed to operate in 9° increments as indicated in the column 114 of the chart 115 of FIG. 11 wherein during the first four increments of clockwise movement of the selector member 103 of the control 100 from its present off or stationary position, no selection of a mode of operation of the microprocessor 24B is provided and no annunciator in the display unit 23B is lit as represented by the column 116 of FIG. 11. In addition, it can be seen in the column 117 of the chart 115 of FIG. 11, that no temperature is being displayed in the area 112 of the display unit 23B during the first 4 increments of clockwise rotation of the selector member 103.

However, after the fourth increment of rotation of the selector member 103 in a clockwise direction thereof, the selector member 103 causes the microprocessor 24B to be set for a bake mode of operation thereof with the selector member 103 incrementing the temperature of such bake mode by 10° from 100° to 300° through the next 20 increments of rotation thereof where thereafter the next 40 increments of rotation of the selector member 103 in the clockwise direction selects the temperature for the bake mode of operation in 5° throughout the entire bake range of operation thereof.

Once the particular temperature for a selected bake operation has been reached, the operator can press the start actuator 30B to cause the microprocessor 24B to operate the heating means 105 so that the bake element 106 provides the selected temperature and will continue such operation until the stop actuator 37B is pressed.

Of course, a delayed start and stop operation for such selection can be provided by using the selector 27B in the manner previously described for the control 35.

Also, the bake mode of operation can be terminated by the selector member 103 being rotated in a counterclockwise direction until the word "OFF" is displayed in the area 112 of the display unit 23B, the word "OFF" being displayed for 5 seconds and then the temperature displays a blank in the area 112. Of course, the baking operation can also be cancelled by two taps on the "STOP/CANCEL" actuator 37B within 2 seconds.

Similarly, if a broil mode of operation of the heating means 105 had been selected by the selector member 103, the broil mode can be terminated by one of those same two methods, i.e., the "STOP/CANCEL" actuator 37B can be tapped twice within 2 seconds or the selector member 103 can be rotated counterclockwise to its off position.

When such a temperature operation is cancelled or dialed off, the temperature display changes to the word "OFF" and the word "OFF" is displayed for 5 seconds and then the temperature displays a blank.

The low broil operation of the control 100 is provided during the 4 increments of movement of the selector member 103 after the bake mode and the high broil operation is selected during the next 4 increments of operation thereof as illustrated in FIG. 11, the words "LO" and "HI" being displayed in the area 112 while the word "BROIL" is lit in the area 113 of the display unit 23B.

The clean mode of operation of the microprocessor 24B is selected after the next 4 dial increments of the selector member 103 from the last high broil position thereof as illustrated in FIG. 11 whereby further continuous rotation of the selector member 103 in the clean position thereof can be infinite and once the clean operation has been selected, the word "CLEAN" will appear in the area 113 of the display 23B while the area 112 remains blank.

When the display unit 23B has the word "CLEAN" lit thereon, the cleaning operation can then be initiated by depressing the start actuator 30B whereby a 2½ hour clean cycle is automatically initiated in the same manner as the control 35. However, if the oven door has not been locked, the display unit 23B will spell "DOOR" until the door is locked before the cleaning operation will begin.

Figure 5:
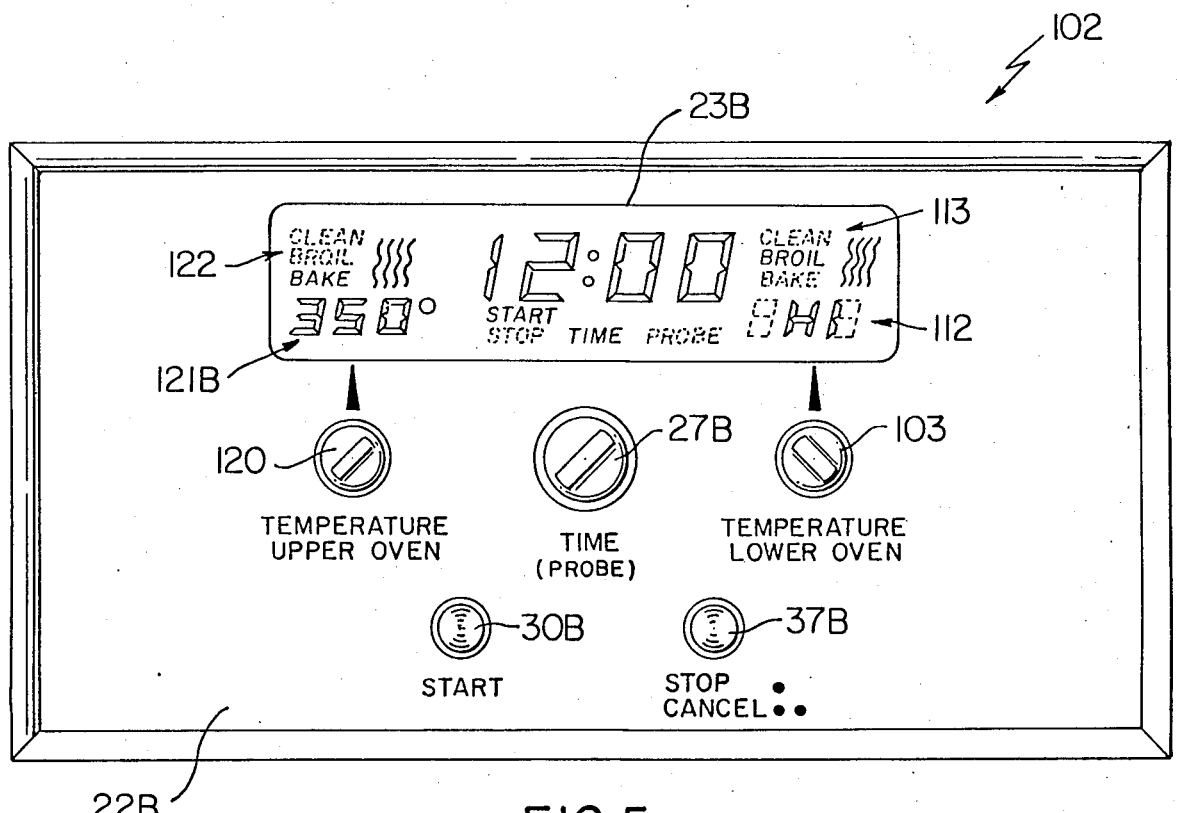
FIG. 5 is a view similar to FIG. 1 and illustrates another embodiment of the electrically operated appliance control of this invention.

The control 102 of FIG. 5 operates in substantially the same manner as the control 100 except that the same has an additional temperature selector 120 which operates an upper oven (not shown) of a double oven cooking apparatus (not shown) while the selector member 103 operates the lower oven thereof, the display unit 22B having the areas 112 and 121 respectively for the temperature settings of the selector members 103 and 120 and the areas 113 and 122 for indicating the particular selected mode of operation set by the selector means 103 and 120.

Figure 6:
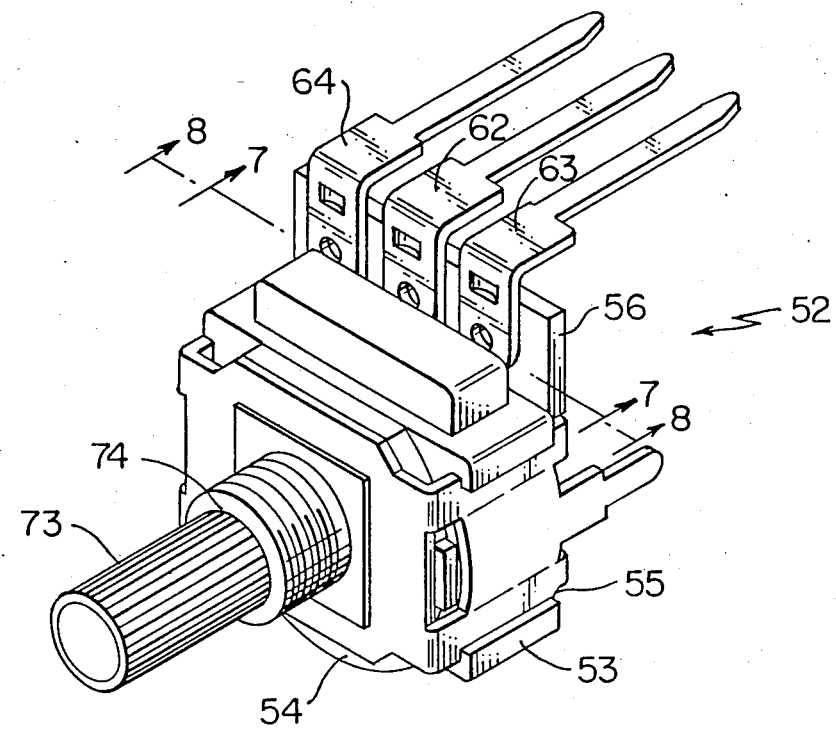
FIG. 6 is a perspective view of a rotary switch that comprises a selector means for the various electrically operated appliance controls of this invention.

The selector member 120 for the upper oven of the control 102 operates a selector means 123 as illustrated in FIG. 10 with the selector means 123 being a rotary switch similar to the rotary switch 52 of FIG. 6 previously described. The selector means 123 has one side thereof interconnected to the ground lead 110 of the electrical means 101 of FIG. 10 while the other side thereof is interconnected to the microprocessor or device 24B by a lead means 124 as illustrated.

As illustrated in FIG. 10, the power source leads L1 and L2 of a power source 125 for the heating means 105 for the lower oven, as well as for the heating means 126 of the upper oven which comprises a bake element 127 and a broil element 128, are respectively interconnected to the heating elements 106, 107, 127 and 128 when relay switch means 129, 130, 131 or 132 are closed by the microprocessor 24B operating the respective relay coil means 133, 134, 135, 136 if the start actuator 30B had been momentarily closed against the contacts 31B and 32B to initiate the operation as well as to a close relay switch means 137 that is interconnected to ground 138 when a relay coil 139 has current passing therethrough by the actuator 30B also having closed against other contacts 140 and 141 to provide a holding circuit through another relay contact switch means 142 as illustrated in FIG. 10.

If desired, meat probe means 143 can be provided for the upper and/or lwoer oven and be interconnected by a lead means 144 to an A/C converter 145 that is interconnected to the microprocessor 24B by a lead means 146.

Oven door lock/switches 147 and 148 for the upper and lower ovens as well as a high limit switch 150 can be provided and be respectively electrically interconnected to the microprocessor 24B by lead means 151, 152 and 153 as illustrated in FIG. 10.

Of course, the microprocessor 24B can operate other devices of the appliance, such as the exhaust fan 154 as illustrated in FIG. 10 and the other items as illustrated as interconnected thereto.

However, since it is well known that a microprocessor 24B can operate various devices through the preprogramming thereof and when the same receives certain signals, such as from the rotary switch means 28B and 104 as set forth in the aforementioned copending patent applications, a further detailed discussion of the electrical means 101 for the controls 100 and 102 is not necessary.

However, the operation of the control 100 with the selector means 103 will hereinafter be set forth with the understanding that the same operation occurs for the lower oven with the selector means 103B and to the upper oven with the selector means 120 of the control 102.

The microprocessor 24B is preprogrammed in a manner well known in the art to provide the following functions for the operation of a cooking apparatus utilizing the control 100.

In particular, the microprocessor 24B of the control 100 controls all thermal oven operations from a bake temperature of approximately 100° F. to a clean temperature of approximately 900° F. All timing functions of the microprocessor 24B such as time of day, minute timer, delayed start, delayed stop and alarm remainder are incorporated into time digits, temperature digits and word prompting annunciators of the display unit 23B of the control 100.

Operator interface to the control 100 is through the use of two non-positional detent rotary switches 28B and 104 which respectively have rotary selector members 27B and 103 and through two discrete momentary switches or actuators 30B and 37B. The temperature rotary selector member 103 will input all temperature functions from 100° F. to 900° F. into the control 100. The temperature rotary selector member 103 will also perform the appropriate function selection operation for bake, broil and clean. The time entry rotary selector member 27B inputs all timing functions into the control 100, the timing functions comprising time of day, start time, stop time, and minute or interval timer. The discrete start actuator 30B enters start initiation and start time input. The discrete stop/cancel actuator 37B enters stop time and enters cancel when depressed twice in succession. The control 100 provides all pertinent timing function selection and temperature data continuously during all operations. The visual display unit 23B is made up of seven segment digits and eight prompting words and/or symbols.

The control system 101 for the control 100 has the following basic features, clock, broil high, clean, delayed start time, continuous three digit temperature control, probe temperature option, bake temperature, broil low, minute or interval timer, delay start time, and continuous time of day.

The parts of the self contained control 100 and/or 102 can comprise that section of the control means 101 of FIG. 10 that is enclosed within the enclosing line 155 of FIG. 10 whereby it can be seen that the control 100 or 102 can be readily electrically interconnected to the various devices of a cooking apparatus to operate in a manner now to be described.

The bake mode of the cooking apparatus utilizing the control 100 is accessed by rotation of the temperature selector 103 clockwise whereby the temperature will increment in ten and thenfive degree increments until the desired bake temperature is displayed in the section 112 of the display unit 23A. The bake operation is then initiated with a momentary closure of the start actuator 30B.

The bake mode can be terminated by one of two methods, i.e., the "STOP/CANCEL" actuator 37B can be tapped twice within two seconds or the bake temperature can be rotated off with the selector member 103 being rotated in a counterclockwise direction. When the temperature operation is cancelled or dialed off, the temperature display 112 changes to the word "OFF". The word "OFF" is displayed for five seconds and then the temperature display 112 blanks.

The broil mode is accessed by rotating the temperature selector 103 clockwise through the bake mode temperatures until the broil mode is accessed. The accessing of the broil mode is denoted by the word annunciator "BROIL" and one of the two broil settings, the two broil settings being respectively displayed in the temperature area 112 as "HI" and "LO".

The broil mode can be terminated by one of two methods, i.e., the "STOP/CANCEL" actuator 37B can be tapped twice within two seconds or the broil temperature can be rotated off with the rotary temperature selector 103 rotated in a counterclockwise direction. When the temperature display 112 changes to the word "OFF" and the word "OFF" is displayed for five seconds and then the temperature display 112 blanks.

If a probe operation is selected by insertion of the probe 143, the time digits display of the display unit 23B changes from time of day to 100° F. The selector member 103 will then function as a probe temperature dial and rotating the selector member 103 will increment the display in five degree increments until the desired temperature is reached (the range being 100° F. to 200° F.). The probe mode cooking operation is them started by touching the start actuator 30B. During a probe cooking operation, the time display unit 23B will indicate the actual probe temperature. If one wishes to change or review the probe set temperature, the operator simply touches the "STOP/CANCEL" actuator 37B. When the oven is at rest in the probe mode, the temperature display 112 will indicate the oven temperature, the "BAKE" annunciator will be lit continuously and the element annunciator 156 of FIG. 4 will be flashing with a two seconds on/two second, off rate and the probe set temperature will be displayed. While in an active cooking probe mode, depressing the actuator 30B will access the time of day for three seconds and the display 23B will then return to actual probe temperature.

In this probe mode, when the probe set temperature is reached, the control 100 will sound a standard end of cycle alarm with the alarm 50B and the oven will then automatically be turned off by the microprocessor 24B and the actual probe temperature will be continued to be displayed at the display unit 23B.

The clean mode of operation of the control 100 is selected by clockwise rotation of the temperature rotary selector member 103 in the control inactive state. When the display unit 23 lights the word "CLEAN", the control 100 can be initiated. A 2½ hour clean cycle is initiated when the start actuator 30B is touched. If the door has not been locked, the display will spell "DOOR" until the door is locked.

If a prolonged, shortened or delayed clean time is desired, the opertor can enter the "START TIME" and the "STOP TIME" in the same manner as the control 35 previously described and therefore such operation need not be described for the controls 100 and 102 of this invention.

The microprocessor 24B can be so programmed that the control 100 can be used as an alarm when a cooking operation is not planned before the alarm operation. To enter an alarm time of day, the stop actuator 30B is depressed for three seconds and a two second key recognition will sound and the word "STOP TIME" will light. The desired alarm time is then entered by rotating the time selector 27B to the desired "STOP TIME" (the display unit 23B increments in 5 minute increments during such rotation). Touching the start actuator 30B will initiate the alarm feature.

Therefore, it can be seen that the control 100 or 102 of this invention comprises an electrically operated device 24B for providing various modes of operation thereof, an electrically operated visual display unit 23B, and a manually operated selector means 103, 30B electrically interconnected to the device 24B and the unit 23B for selecting a desired mode of operation of the device 24B and for setting the device 24B to provide that selected mode in a desired set manner thereof as being indicated on the display unit 23B by such operation of the selector means 103, 30B, the selector means 103, 30B having a manually operated start actuator 30B which when actuated will cause the device 24B to begin to produce the selected mode of operation thereof and in that selected set manner thereof. The selector means 103, 30B comprises a manually movable selector member 103 which when moved in one direction thereof from an off position thereof first selects one of the modes of operation (bake) and then sets the device 24B to provide that selected mode of operation in a desired manner (temperature setting) thereof as being indicated on the display unit 23B as the selector member 103 is being moved in the one direction from the off position thereof to a certain first position thereof and which when moved in the one direction to the first position thereof selects another mode of operation thereof (broil) and then sets the device 24B to provide that other selected mode of operation in a desired manner (low or high) as being indicated on the display unit 23B as the selector member 103 is being moved in the one direction beyond the first position thereof.

Thus, it can be seen that in the controls 20, 35, 100 and 102 of this invention, a minimum number of mechanical switches and selectors for data entry are utilized. This unique part of the human interface with the controls of this invention is made possible through dual and triple function of the data entry switches and rotary selector member therefor but not at the sacrifice of simplicity of operation. For example, the most common used function such as an interval timer function and a normal temperature operation are accessed with a simple twist of the respective selector member 27 103. The microcomputer software controls all data range limits and incrementally controls data entry with increasing accuracy and this form of unique data entry reduces the number of degrees a selector member has to be rotated to achieve the desired data input.

The rotation of the temperature selector member 103 performs two functions simultaneously, i.e., the rotation of the selector member 103 increments the temperature with increasing accuracy and automatically selects the appropriate oven function mode. The display unit 23B interfacing with the rotary selector member 103 gives the user a continous feedback of temperature selection and word prompts the user as to what oven function the person is selecting. The broil and clean function modes are automatically selected as the selector member 103 is rotated and the microcomputer 24B will control the appropriate fixed temperatures for specific oven manufacturers.

The time rotary selector 27 or 27B performs all time related data entry and the unique aspect of the time selector member 27 or 27B is its movable function without sacrificing simplicity of operation. Since the most common used feature on a cooking apparatus is the interval timer thereof, the interval time is accessed by merely rotating the selector member 27 or 27B clockwise one increment and the display unit 23 or 23B starts counting up in preprogrammed increments. The time of day set mode is accessed by rotating the selector member 27 or 27B counterclockwise one full revolution whereby the control will beep or flash as it enters the clock set mode and then proceeds to increment in one minute steps until the desired time of day is present in the display unit. The time of day is then set with a single touch of the actuator 30 or 30B.

The simplicity of entering an oven self-clean mode is another unique feature of the controls of this invention. To select a self-clean operation, the user simply rotates the temperature selector member 103 until the display unit 23B prompts "CLEAN", "START TIME" and time of day whereby the preprogrammed automatic clean time is then initiated with a single touch of the start actuator 30 or 30B.

Since delay cook/clean control capabilities are used less often by consumers, this feature is maintained in the background of control capability. thus, to access a start time, the user simply depresses the start actuator 30A or 30B for three seconds. When the start time set mode is accessed, the control beeps momentarily and displays time of day and word prompts "START TIME". The desired start time is then entered in five minute increments by rotating the time selector member 27A or 27B. The delayed cook/clean operation is then initiated by a simple touch of the start actuator 30A or 30B. Stop time is then entered by depressing the stop actuator 37 or 37B for three seconds. When the stop time set mode is accessed, the control beeps momentarily and displays time of day and word prompts "STOP TIME". The desired stop time is then entered in five minute increments by rotating the time selector member 27A or 27B. The delayed cook/clean operation is then initiated by a single touch of the start actuator 30A or 30B.

The controls of this invention each incorporates a pleasant end of cycle alarm at the end of any interval timer period or cooking operation. The control will sound a three second end of cycle alarm and then assume a pleasant reminder mode of ½ second on 9½ seconds off until reset or a ten minute or fifteen minute time out occurs.

Thus, it can be seen that the human interface of the various controls of this invention is unique in their simplicity, the interface of the date entry and the accurate continuous feedback of input data and control operating data is believed to be totally unique in electronic range controls. In addition, the use of the solid state rotary switches previously described make the control system most cost effective possible for the complexities of applying an electronic control to a cooking apparatus.

Another feature of the solid state rotary switch controls of this invention is to make each control as simple as possible to operate while this microcomputer thereof functions to limit the ranges of cook time to a maximum of twelve hours, clean time to a maximum of four hours, interval time to a maximum of ninety-nine minutes and time of day entries within normal clock limits so as to tend to minimize data entry with the control.

Thus, it can be seen that each control of this invention has been designed around a simplicity of human interface, continual display of pertinent control data, speed of data entry, microcomputer software control of data entry ranges and with an attempt to minimize erroneous data entry. In each control of this invention, the over control functions must first be identified followed by the desired data.

It can also be seen that in each of the rotary selector means of the controls of this invention, the off or initial stationary position thereof is the last set rotary position of the selector member thereof because the microprocessor returns to its off condition for the selected mode or operation thereof after the selected mode of operation has been completed thereby, whereby the microprocessor then resets itself and a new selection of a program of operation thereof is determined by the microprocessor sensing initial direction of rotary movement of the particular selector member through the code pattern of the selector means thereof. In this manner, the rotary selector means each has a random start position and thus the selector member thereof does not have to be returned to a home or off position by the operator as in most electrical-mechanical controls.

Therefore, it can be seen that this invention not only provides new electrically operated appliance controls but also this invention provides new methods of making such electrically operated appliance controls.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In an electrically operated appliance control comprising an electrically operated device for providing various modes of operation thereof, an electrically operated visual display unit, and a manually operated selector means electrically interconnected to said device and said unit for selecting a desired mode of operation of said device and for setting said device to provide that selected mode in a desired set manner thereof as being indicated on said display unit by such operation of said selector means, said selector means having a manually operated start actuator which when actuated will cause said device to begin to produce the selected mode of operation thereof and in that selected set manner thereof, the improvement wherein said selector means comprises a manually movable selector member which when moved in one direction a certain amount from an off position thereof to a first position thereof first selects one of said modes of operation and then sets said device to provide that selected mode of operation in a desired manner from a first sequence of operations thereof as being indicated on said display unit as said selector member is being further moved in said one direction between said first position thereof thru a certain distance that provides said first sequence of operations and a certain second position thereof and which when moved in said one direction to said second position thereof selects another mode of operation thereof and then sets said device to provide that other selected mode of operation in a desired manner from a second sequence of operations thereof as being indicated on said display unit as said selector member is being further moved in said one direction beyond said second position thereof thru a certain distance that provides said second sequence of operations.

2. A control as set forth in claim 1 wherein said device has means that is adapted to operate heating means of an oven of a cooking apparatus and wherein said one mode of operation of said device is to have said means of said device operate said heating means in a baking mode thereof.

3. A control as set forth in claim 2 wherein said selector member sets said means of said means of said device to cause said heating means to provide a set temperature depending upon the position of said selector member between said first position thereof that selects said baking mode and said second position thereof.

4. A control as set forth in claim 3 wherein said selector means increases the set temperature as said selector member is moved in said one direction from said first position thereof that selects said baking mode to said second position thereof.

5. A control as set forth in claim 3 wherein said other mode of operation of said device is to have said means of said device operate said heating means in a broil mode thereof.

6. A control as set forth in claim 5 wherein said selector member sets said means of said device to cause said heating means to provide a high broiling operation or a low broiling operation depending upon the position of said selector member between said second position thereof and a position beyond said second position in said one direction.

7. A control as set forth in claim 1 wherein said selector member selects a third mode of operation of said device when said selector member is being further moved in said one direction to a third position beyond said second position thereof.

8. A control as set forth in claim 7 wherein said device has means that is adapted to operate heating means of an oven of a cooking apparatus, said one mode of operation of said device causing said means of said device to operate said heating means in a baking mode thereof, said other mode of operation of said device causing said means of said device to operate said heating means in a broil mode thereof, said third mode of operation of said device causing said means of said device to operate said heating means in a cleaning mode thereof.

9. A control as set forth in claim 1 wherein said selector member is rotatable whereby the movement thereof is a rotatable movement.

10. A control as set forth in claim 9 wherein said selector means comprises a rotary switch means operated by said rotatable selector member.

11. In a method of making an electrically operated appliance control comprising the steps of forming an electrically operated device for providing various modes of operation thereof, forming an electrically operated visual display unit, forming a manually operated selector means, electrically interconnecting said selector means to said device and said unit for selecting a desired mode of operation of said device and for setting said device to provide that selected mode in a desired set manner thereof as being indicated on said display unit by such operation of said selector means, and forming said selector means to have a manually operated start actuator which when activated will cause said device to begin to produce the selected mode of operation thereof and in that selected set manner thereof, the improvement comprising the step of forming said selector means to comprise a manually movable selector member which when moved in one direction a certain amount from an off position thereof to a first position thereof first selects one of said modes of operation and then sets said device to provide that selected mode of operation in a desired manner from a first sequence of operations thereof as being indicated on said display unit as said selector member is being further moved in said one direction between said first position thereof and a certain second position thereof and which when moved in said one direction to said second position thereof selects another mode of operation thereof and then sets said device to provide that other selected mode of operation in a desired manner from a second sequence of operations thereof as being indicated on said display unit as said selector member is being further moved in said one direction beyond said second position thereof thru a certain distance that provides said sequence of operations.

12. A method as set forth in claim 11 and including the steps of forming said device with means that is adapted to operate heating means of an oven of a cooking apparatus, and causing said one mode of operation of said device to have said means of said device operate said heating means in a baking mode thereof.

13. A method as set forth in claim 12 and including the step of forming said selector member to set said means to provide a set temperature depending upon the position of said selector member between said first position thereof that selects said baking mode and said second position thereof.

14. A method as set forth in claim 13 and including the step of forming said selector means to increase the set temperature as said selector member is moved in said one direction from said first position thereof that selects said baking mode to said second position thereof.

15. A method as set forth in claim 13 and including the step of causing said other mode of operation of said device to have said means of said device operate said heating means in a broil mode thereof.

16. A method as set forth in claim 15 and including the step of forming said selector member to set said means of said device to cause said heating means to provide a high broiling operation or a low broiling operation depending upon the position of said selector member between said second position thereof and a position beyond said second position in said one direction.

17. A method as set forth in claim 11 and including the step of forming said selector member to select a third mode of operation of said device when said selector member is being further moved in said one direction to a third position beyond said second position thereof.

18. A method as set forth in claim 17 and including the steps of forming said device to have means that is adapted to operate heating means of an oven of a cooking apparatus, causing said one mode of operation of said device to cause said means of said device to operate said heating means in a baking mode thereof, causing said other mode of operation of said device to cause said means of said device to operate said heating means in a broil mode thereof, and causing said third mode of operation of said device to cause said means of said device to operate said heating means in a cleaning mode thereof.

19. A method as set forth in claim 17 and including the step of forming said selector member to be rotatable whereby the movement thereof is a rotatable movement.

20. A method as set forth in claim 19 and including the step of forming said selector means to comprise a rotary switch means operated by said rotatable selector member.

* * * * *